United States Patent

Moignier et al.

[11] Patent Number: 5,975,468
[45] Date of Patent: Nov. 2, 1999

[54] ROTARY ACTUATOR USING SHAPE MEMORY

[75] Inventors: Philippe Moignier; Gilles Chenut; Heinrich Jabs, all of Toulouse Cedex, France

[73] Assignee: Matra Marconi Space France, Presbourg, France

[21] Appl. No.: 09/042,532

[22] Filed: Mar. 17, 1998

[30] Foreign Application Priority Data

Mar. 18, 1997 [FR] France ................................. 97 03268

[51] Int. Cl.⁶ .................................................. B64G 1/44
[52] U.S. Cl. .............................. 244/173; 60/527; 60/528
[58] Field of Search .............................. 244/173; 60/527, 60/528

[56] References Cited

U.S. PATENT DOCUMENTS

| | | | |
|---|---|---|---|
| 4,700,541 | 10/1987 | Gabriel et al. | 60/528 |
| 4,798,051 | 1/1989 | Foote | 60/527 |
| 4,841,730 | 6/1989 | McDonald | 60/527 |
| 5,127,228 | 7/1992 | Swenson | 60/527 |
| 5,520,359 | 5/1996 | Merhav et al. | 244/173 |
| 5,620,529 | 4/1997 | Bassily et al. | 244/173 |
| 5,653,407 | 8/1997 | Bertheux et al. | 244/173 |

FOREIGN PATENT DOCUMENTS

| | | |
|---|---|---|
| 0340364 | 11/1989 | European Pat. Off. . |
| 2684638 | 6/1993 | France . |

OTHER PUBLICATIONS

Patent Abstract of Japan, vol. 10, Nà. 204 (M–499) (2260), Jul. 17, 1986 & JP 61 046476 A (Matsushita), Mar. 6, 1986–Abstract—.

*Primary Examiner*—J. Woodrow Eldred
*Attorney, Agent, or Firm*—Gary M. Nath; Harold L. Novick; Nath & Associates

[57] ABSTRACT

A rotary actuator includes a bar made of shape memory alloy having ends provided with thermally insulating interface elements for interfacing with elements that are to be rotated relative to each other. An electric heater surrounds the bar and is apt to heat it above its transition temperature to the austenitic domain. The actuator is suitable for deploying or rotating solar panels.

12 Claims, 2 Drawing Sheets

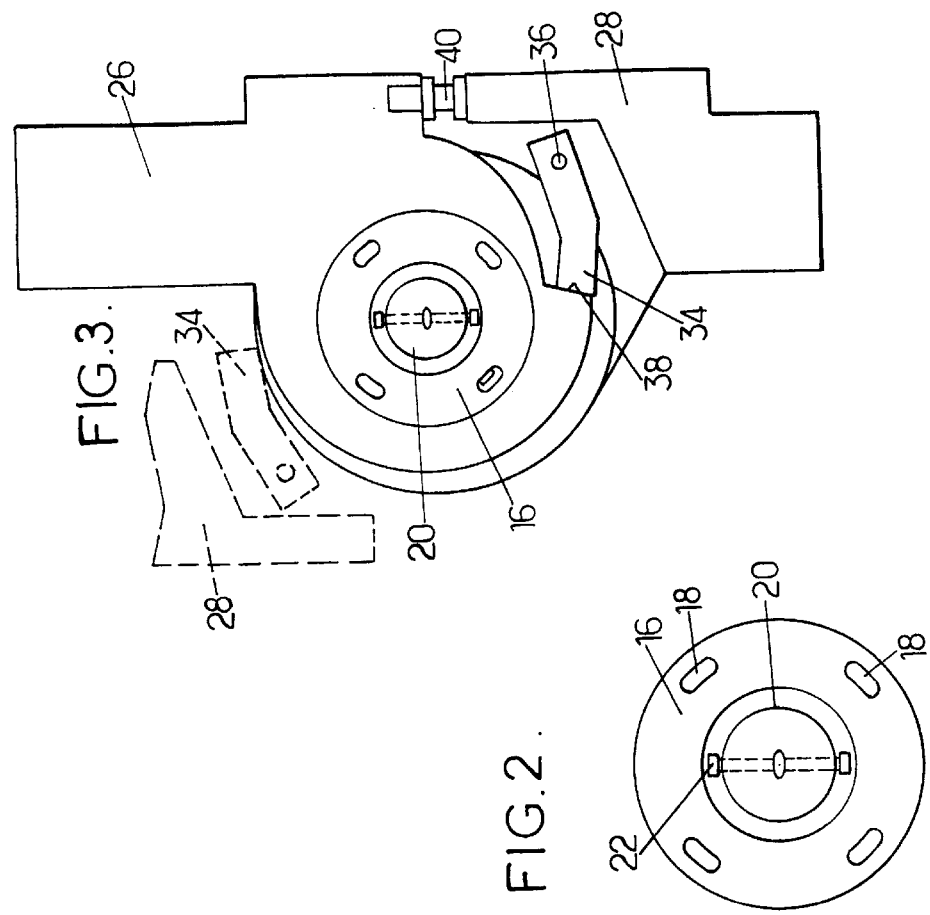
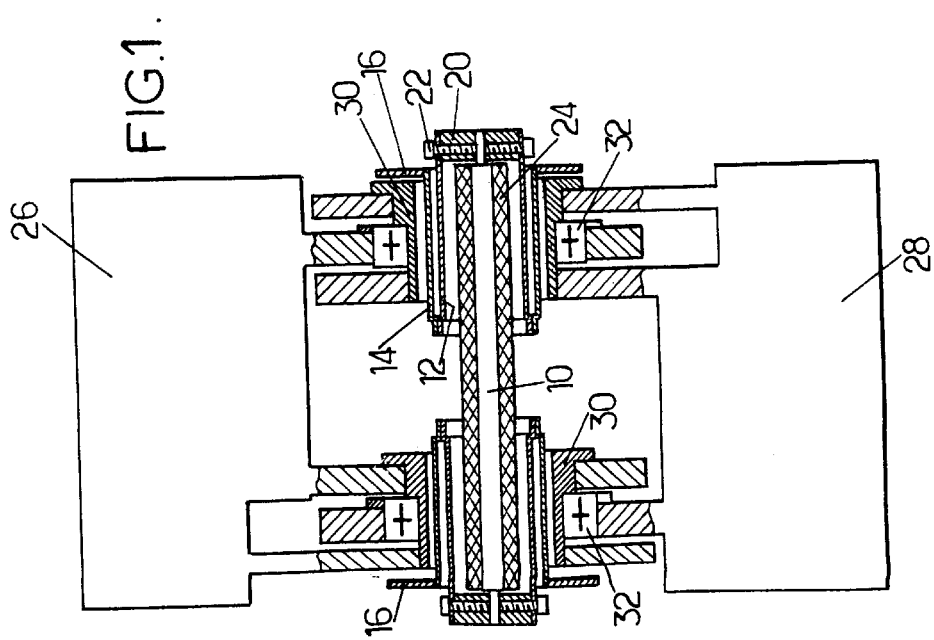

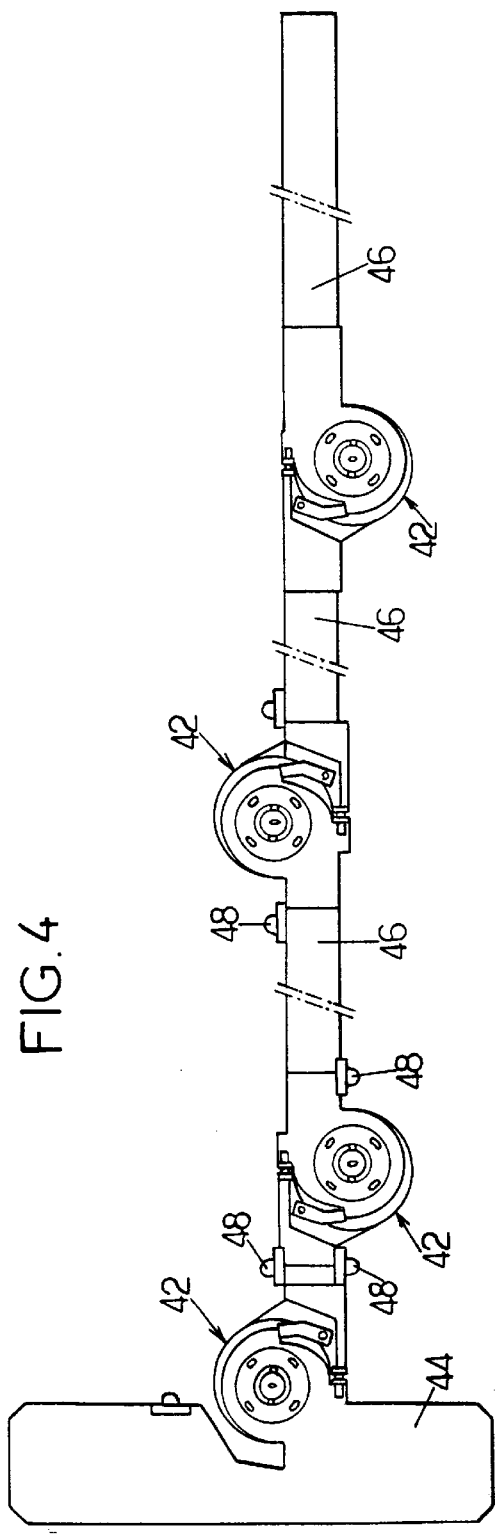
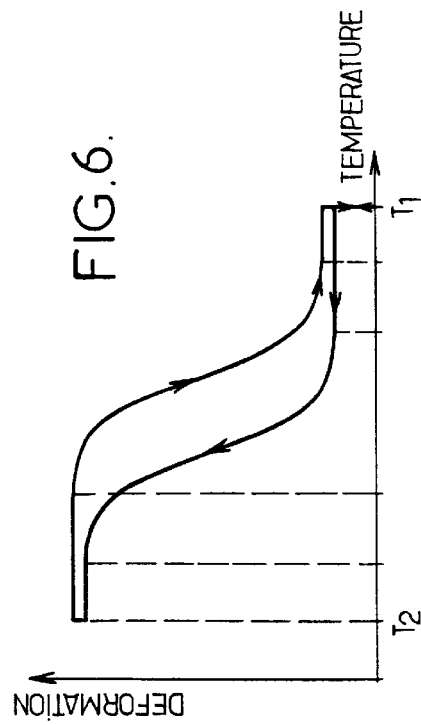
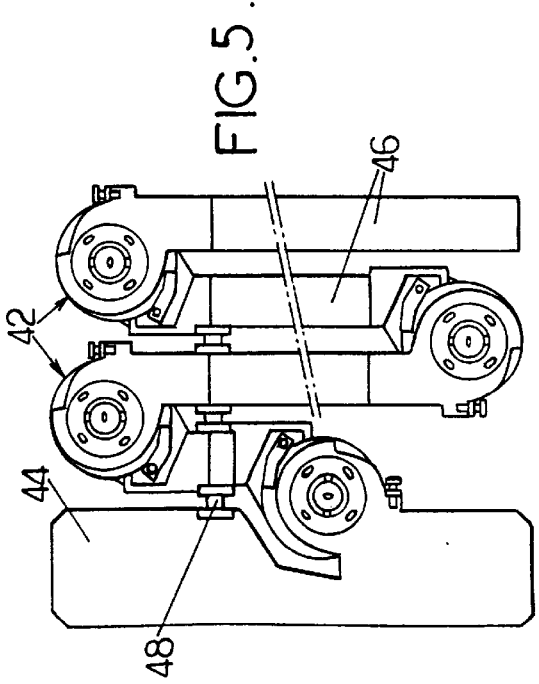

ROTARY ACTUATOR USING SHAPE MEMORY

BACKGROUND OF THE INVENTION

The present invention relates to rotary actuators and it is applicable wherever it is desired to make an actuator of small volume and of simple structure for the purpose of generating a rotary torque over a limited angular range. A particularly important, but not exclusive, application lies in systems for displacing solar panels on space vehicles.

SUMMARY OF THE INVENTION

At present, the functions of defining an axis of rotation, of generating torque, and of regulating the operation of rotation, are generally performed by separate elements. An object of the present invention is to provide an actuator in which the same elements perform all of the functions. To this end, the invention makes use of the property of shape memory alloys which have two different solid phases: a martensitic phase at low temperature and an austenitic phase at high temperature, with the alloy passing smoothly from one phase to the other on being heated.

Consequently, the invention proposes a rotary actuator including a bar made or shape memory material having ends that are provided with thermally insulating interface elements for interfacing with elements that are to be caused to rotate relative to each other, and surrounded by electric heater means enabling the bar to be raised to above its transition temperature to the austenitic domain.

Such an actuator presents numerous favorable characteristics. It is very reliable, because of its small number of components, and because of the way in which the torque exerted varies smoothly at the beginning and at the end of the stroke; its manufacturing cost is low; and it is easy to adapt to its surroundings because of its modular structure.

Its angular range can be considerable, and may exceed 180°; the driving torque can be several Nm, which is sufficient in numerous applications, particularly in weightlessness.

The actuator may operate in one direction only, e.g. when it is designed to deploy the solar panels or the reflectors of a satellite after the satellite has been put on station. It can also be made reversible by associating it with resilient re-cocking means that exert a small torque only. These conventional means may be constituted, in particular, by a spring interposed between the ends of the bar. Under such circumstances, actuation is obtained by heating to cause the bar to pass into the austenitic domain and to maintain its temperature. Re-cocking is produced while cooling under an applied stress.

Alternation between actuation and re-cocking will generally be used to move the driven element and then to return it to its original position. Nevertheless, this alternation, when associated with a ratchet mechanism, can also be used to obtain rotation through any angle, with the only condition being that the frequency of the oscillating cycles should be low enough to be compatible with the thermal inertia of the components to be actuated and with the slowness inherent to the physical phenomena involved. Rotation through 180° can be obtained without difficulty in a few minutes and while using only low heating power.

The heater means may be of a very wide range of structures. The essential need is for them to be capable of accommodating twisting deformation of the bar, which as a general rule is cylindrical in shape. They may be constituted, in particular, by a resistive strip of flexible material wound around the bar and held pressed against it by a coil spring. They may also be constituted by a resistive sleeve having elasticity that holds it pressed against the bar. The heater means may also include a Joule effect heater element having a positive temperature coefficient (PTC), thereby providing temperature regulation since its resistance increases rapidly with temperature above a threshold.

The specific composition selected for the TiNi-based shape memory alloy will depend on the intended application and in particular on the desired transformation temperatures. In general, a TiNi alloy is used having a small Cu content, such as the alloy comprising 45.3% Ti, 48.5% Ni, and 6% Cu whose metallurgical properties, apart from its transformation phases, are close to those of titanium.

The interface elements may be constituted in particular by tubular lengths of a metal that has low thermal conductivity, such as titanium, surrounding the end portions of the bar; a plurality of lengths may be placed concentrically and connected mechanically in series to reduce heat conduction. This is not the only possible disposition. The shape chosen will depend on the forces at the interface and on the looked-for thermal decoupling. For example, the elements may be constituted by rings that are interconnected in alternation via their inner and outer peripheries.

The actuator can be used in numerous applications, and in particular in space. Mention may be made in particular of application to a mechanism for deploying or steering a reflector; an antenna; a solar panel; a balance arm, a piece of equipment; a panel; or a structure of a space vehicle.

The invention will be better understood on reading the following description of a particular embodiment of the invention, given by way of non-limiting example. The description refers to the accompanying drawings.

BRIEF DESCRIPTION OF THE DRAWINGS

FIG. 1 is a longitudinal section through the essential components of an actuator constituting a particular embodiment of the invention;

FIG. 2 is an end view of the means for fixing an element that is to be moved angularly;

FIG. 3 is an end view of the FIG. 1 actuator, showing its two extreme positions;

FIGS. 4 and 5 are end views of a solar panel fitted with FIG. 1 actuators and shown respectively in the deployed state and in the folded state; and FIG. 6 shows how the deformation of an alloy suitable for implementing the invention varies as a function of temperature, i.e. it shows its hysteresis cycle.

DETAILED DESCRIPTION

The actuator whose basic structure is shown in FIG. 1 comprises a cylindrical bar 10 of shape memory alloy, generally a TiNi alloy having a small copper content, which passes progressively from the martensitic state to the austenitic state when heated from a cold temperature $T_2$ to a hot temperature $T_1$, passing through various crystallographic states (FIG. 6). Such a bar, when subjected to twisting stress at a temperature of at least $T_1$ and then cooled down to $T_2$ retains the twisting deformation that has been imparted thereto. If it is subsequently heated up again, it will tend to return to its original shape and is capable of exerting torque. The angular deformation can be as much as 180° for a bar whose length is about twenty times its diameter, and can indeed exceed 180°.

Interface elements are fixed at the ends of the bar to perform various functions. They provide mechanical connection with the elements that are to be turned relative to each other and they transmit force. They limit heat interchange between the bar and the environment. In the example shown in FIG. 1, each of the interface elements is constituted by two concentric lengths of tube made of material having low thermal conductivity, such as titanium. The inner length of tube 12 is connected at one end to the bar 10 and it surrounds a terminal portion of the bar. The outer length of tube 14 surrounds the inner length and it connects the end of said inner length that is nearer to the center of the bar to an outer element that is to be moved angularly.

In the example shown in FIG. 1, the junction with each outer element is made via a respective ring 16 to which the outer length 14 is fixed in permanent manner, e.g. by welding. The ring is pierced with oblong holes 18 for receiving fixing screws, thereby making it possible to adjust its angular position relative to the outer element which is to be driven or to the element which serves as a support, as the case may be.

The inner tubular length may be connected to the corresponding end of the bar in various different ways. In the example shown in FIG. 1, the inner length is fixed in permanent manner to the periphery of a disk 20 which is pierced by a central hole for receiving an extension of the bar. Radial tapped passages in the disk 20 receive compression screws 22 for bearing against the extension and securing the disk to one end of the bar. This modular structure makes it simple to assemble and disassemble the actuator proper.

If necessary, this design also makes it possible to re-cock the actuator externally. The portions 12, 14, 16, and 20 may be implemented as a single piece made by electroerosion or by welding.

Means 24 for heating the bar cover substantially the entire length thereof. These means may be of various structures. They may be constituted by a resistive strip of flexible material provided with connections for receiving electricity and held pressed against the bar by a helically wound coil spring (not shown) surrounding the strip and exerting a compression force thereon. They may also be constituted by a sleeve of elastic material containing a heating resistance, or by other elements. If a material having a positive temperature coefficient is used, it is desirable to adopt a material whose resistance increases strongly at a temperature that is slightly greater than the temperature at which the alloy is completely transformed to the austenitic state.

The favorable properties of such an actuator include the following: small size and mass; movement that is smooth and free from vibration; no shock at the end of its stroke; and a final position that is stable in the absence of stress.

External elements that the actuator is to move relative to each other can be connected by a wide variety of means. In the example shown in FIG. 1, the rings 16 are designed to be fixed to respective end fittings 26 and 28. Screws passing through the oblong holes 18 connect the rings to respective bushes 30, each carrying a ball bearing or a ring 32. Each end fitting is fixed at one end of the bar to one of the bushes 30 and at the other end of the bar it turns on one of the rings or bearings 32.

When the actuator is designed to operate once only, it may be accompanied by locking means which hold it in the position to which it has been brought by being heated. In the example shown in FIG. 3, a pawl 34 is mounted on a pin 36 carried by the end fitting 26. A spring (not shown) keeps the pawl pressed against the other end fitting 28 which has a step 38 against which the pawl engages at the end of the movement. A generally-adjustable end-of-stroke abutment 40 can be mounted on the end fitting 26 to determine a limit position for the end fitting 28 and to prevent relative movement or vibration. Heating can then be switched off.

When it is desired to make the actuator reversible, resilient return means are provided that are capable of exerting a torque that is not less than the torque required for re-cocking the bar into its initial state. The re-cocking torque is smaller than the drive torque that the bar made of memory alloy is capable of delivering when it is heated (heat energy being transformed into mechanical energy). The re-cocking means can be constituted, for example, by a spring interconnecting the two ends of the bar or interconnecting the two end fittings. Under such circumstances, the torque that can be exerted by the bar must be sufficient to overcome both friction forces and the opposing force of the resilient re-cocking means.

The characteristics of an actuator of the invention are particularly advantageous for deploying solar panels on a satellite. Under such circumstances, it is desirable to avoid any shock and to perform deployment very smoothly. FIGS. 4 and 5 show a solar panel fitted with four actuators 42 of the kind shown in FIG. 3, one of which connects the panel as a whole to the body 44 of the satellite while the others interconnect individual panel portions 46. To keep down the number of electrical connections that need to pass through the mechanism for pointing the solar panel relative to the sun, direct connections to the satellite platform can be obtained by means of contact studs 48. They can be placed on the endpieces at locations such as to come into mutual contact when the panel portions are folded against one another, during launch and until the satellite has reached its station. Once on station, the panels can be deployed sequentially by feeding the actuators via the contact studs 48.

Another possible application of an actuator of the same general kind as that shown in FIG. 3, but without a pawl 34 for locking it in its end position, lies in steering solar panels on a satellite in low orbit, which passes through the earth's shadow on each revolution. Under such circumstances, the temperature of the bar 10 is controlled so that the turning caused by the actuator tracks the apparent movement of the sun. Heating is interrupted during the eclipse phase so the return spring performs re-cocking. The smoothness of the transformation as shown in FIG. 6 makes such control possible. It can be implemented as a closed loop by providing a rotary coder on the connection between the satellite body and the solar panel.

It is also possible to implement the actuator so that it can drive an angular displacement of arbitrary amplitude. For that purpose, a mechanism is incorporated in the bar enabling it to be disconnected from the fixed portion and re-cocked by a return spring after each drive stroke, and then reconnected. This reconnection of the bar with the fixed portion (and/or the moving portion) can also be achieved using an element made of an alloy having shape memory, such as an elastic sleeve of shape memory material provided with heater means or a rachet mechanism actuated by a spring or blade of shape memory alloy. Two mechanisms acting in opposite directions can be associated to provide both-way control.

We claim:

1. A rotary actuator comprising:
   a single bar of shape memory material having ends arranged to mutually rotate about an axis of said bar, a pair of thermally insulating interface means each for interfacing one of said ends with one of two elements that are to be rotated relative to each other by said bar, each of said pair comprising a plurality of mutually coaxial tubular lengths of a metal having low thermal conductivity surrounding a respective end portion of the bar, said lengths being in mechanical series relation, a first one of said lengths being connected to a respective one of said ends and a terminal one of said lengths being connected to one of said elements; and electric heater means surrounding said bar for heating said bar from a temperature where said material is martensitic to a temperature where said material is austenitic.

2. An actuator according to claim 1, further comprising recocking spring means for exerting a torsion torque between the ends of the bar in a direction opposite to a direction along which said bar exerts a torque when headed to become austenitic.

3. An actuator according to claim 1, further comprising means for locking said elements in a relative position caused by heating of the bar.

4. An actuator according to claim 1, wherein said electric heater means comprise a resistor of flexible material wound around the bar and held pressed against the bar by coil spring means.

5. An actuator according to claim 1, wherein said electric heater means comprise an eletrically resistive sleeve having an elasticity that holds said sleeve pressed against the bar.

6. An actuator according to claim 1, wherein said electric heater means comprise a Joule effect heater element having a positive temperature coefficient.

7. A rotary actuator according to claim 1, wherein said tubular lengths consist of a radially inner length having an axially outer end connected to one end of said bar and of a radially outer length having an axially outer end connected to said element and an axially inner length connected to an axially inner end of said radially inner length.

8. A mechanism for angularly steering a solar panel of a low earth orbit satellite with respect to a body of the satellite, comprising:

a single bar of shape memory material having ends, said shape memory alloy being selected for passing progressively from martensitic to austenitic through intermediate crystallographic states, first thermally insulating interface means connecting one of said ends to said body, second thermally insulating interface means connecting the other of said ends to said solar panel, and electric heater means surrounding said bar for heating said bar from a temperature where said material is martensitic to a temperature where said material is austenitic, whereby said bar supports said panel and constitutes an axis of rotation and a torque therefor.

9. A mechanism according to claim 8, further comprising means for controlling said electric heater means for the panel to track apparent movement of the sun and cutting off heating a during eclipse phases.

10. A rotary actuator for rotating a first element and a second element relative to each other about an axis of rotation, comprising:

a bar of shape memory material having ends arranged to be mutually angularly movable about an axis of said bar;

electric heater means surrounding said bar for heating said bar from a temperature where said material is martensitic to a temperature where said material is austenitic, and a pair of thermally insulating interface means for interfacing said elements and said bar, wherein each of said interface means comprises tubular means of low thermal conductivity connected to one of said ends, surrounding a respective end portion of the bar and having a first end connected to the bar and a tubular bush surrounding the tubular means and having an end connected to a second end of the tubular means; and wherein each of said first element and second element has a fitting rotatably connected a respective said tubular bush and non-rotatably connected to the other tubular bush, whereby said actuator constitutes both a torquer and means for defining said axis of rotation.

11. A rotary actuator according to claim 10, wherein said shape memory alloy is a TiNi alloy selected for passing progressively from the martensitic state to the austenitic state through intermediate crystallographic states.

12. A rotary actuator according to claim 10, wherein one said fitting is connected to a panel portion of a solar panel of a satellite and the other said fitting is connected to an adjacent panel portion of said solar panel, said actuator having a range of actuation selected for deployment of the solar panel from a fully folded condition to a fully deployed condition.

* * * * *

UNITED STATES PATENT AND TRADEMARK OFFICE
CERTIFICATE OF CORRECTION

PATENT NO. : 5,975,468
DATED : November 2, 1999
INVENTOR(S) : Moignier et al.

It is certified that error appears in the above-identified patent and that said Letters Patent is hereby corrected as shown below:

Claim 8, Line 5, Replace "torque" with --torquer--

Claim 9, Line 4, delete "a".

Signed and Sealed this

Thirtieth Day of May, 2000

Attest:

Q. TODD DICKINSON

Attesting Officer

Director of Patents and Trademarks